July 29, 1952 J. H. HOMRIGHOUS 2,605,434

SINGLE BEAM THREE COLOR CATHODE-RAY TUBE

Filed Dec. 8, 1949

INVENTOR.

John H. Homrighous

Patented July 29, 1952 2,605,434

UNITED STATES PATENT OFFICE 2,605,434

SINGLE BEAM THREE COLOR CATHODE-RAY TUBE

John H. Homrighous, Oak Park, Ill.

Application December 8, 1949, Serial No. 131,865

20 Claims. (Cl. 313—92)

This invention relates to a cathode ray tube for use in facsimile and television systems and more particularly to a single beam three color cathode ray tube for the production of pictures simulating the colors in a scene being televised.

A main object of my invention is to provide a cathode ray tube having a screen with a number of elongated parallel grooves to form lenticular lenses on its inter-surface. The grooves preferably are circular and coated with different phosphors with aluminized or other reflecting material applied over the phosphors so that light rays from the different phosphors in sets of three adjacent grooves, when activated by electrons, may be directed to a common strip or a single line across the face or outside surfaces of the screen.

Another object of the invention is to provide a cathode ray tube screen of such design that light rays of respective primary colors from adjacent lines of activated phosphors or other color producing materials may be additively combined to produce color images on the screen in close simulation of the scene being televised.

Another object of the invention is to provide a cathode ray tube with a single electron beam for the reproduction of images in different colors.

Another object is to provide economical and simple television receiving apparatus for the reproduction of pictures in color.

Another object of my invention is to provide a cathode ray viewing tube which will produce substantially complete color images through employment of a single electron beam under control of transmitted signals representative of the different colors in the scene being televised.

A further object of the invention is to provide a cathode ray tube screen with a plurality of parallel strips of fluorescent materials, each adapted and arranged to be activated by a single electron beam to produce images in full color.

Still a further object is to provide across the inner-face of the cathode ray tube screen a plurality of grooves of other contour coated with different phosphors or fluorescent materials arranged to produce light rays of the different primary colors in different series or sets; for instance the first, fourth etc. grooves from the top or left side of screen may have a phosphor to emit, when activated, red light rays; the second, fifth etc. grooves may have a phosphor to yield green light rays; and the third, sixth etc. grooves may have a phosphor to produce blue light rays. The grooves for each set of three colors are of such curvature as to provide, through the employment of an aluminized coating over the phosphors, convex mirrors to direct the red, green and blue light rays of each series or set to a common strip or line across the outer-face of the viewing screen, so that for each three lines scanned on the inter-face of the screen parallel to the grooves only one line in effect will be produced on the outer-face of the screen.

There have been several color television receiving systems developed wherein a single cathode ray tube with several electron guns have been employed to produce images in color on one or more screens using two or more phosphors. Other systems have used different phosphors in strips across the screen. But in none of these systems are the colored light rays from each series of a number of repeating series of two or three lines or strips of phosphors combined and directed to a single line or strip on the viewing side of the image screen.

In the present invention I employ a screen with multi-mirror effects to additively combine or direct light rays of different colors from two or more lines of phosphors, scanned by an electron beam from a single source, to a single line or strip on the face of the viewing screen.

Other objects and advantages will appear from the following description taken in connection with the accompanying drawings in which.

Figure 1:
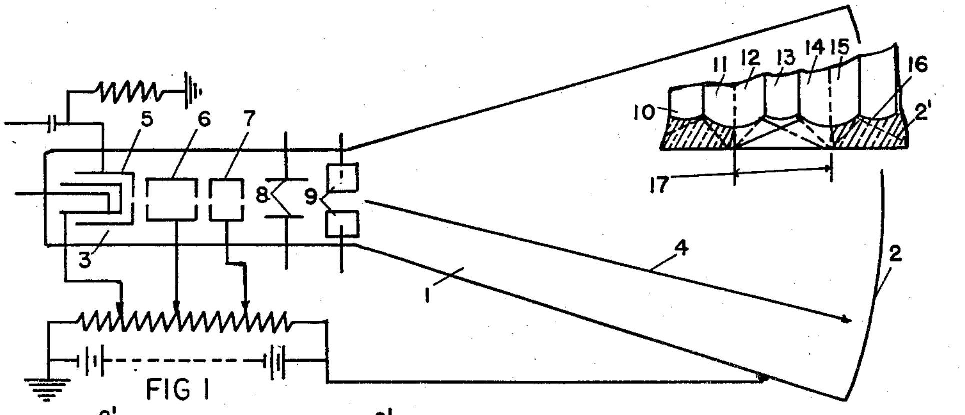
Figure 1 is a diagrammatic view showing a preferred embodiment of the cathode ray tube, illustrating the principles applied in this invention.

Referring to Figure 1 the reference numeral 1 comprises an evacuated envelope or bulb with a screen 2 forming one end of the bulb or cathode ray tube. This tube, similar to a conventional picture or kinescope tube except for the screen structure, may be provided with an electron gun 3 to produce a beam of electrons illustrated at 4, which beam is under control of received signals applied to the control grid 5. Accelerating and focusing anodes are shown at 6 and 7. The focusing anode 7 may be circular or slightly oval, with the vertical radius shorter than the horizontal so that the electron beam 4 may be focused on the screen 2 with an oval or relatively flat cross sectional area in order to scan a greater number of lines per frame. Vertical deflecting plates are shown at 8 and horizontal deflecting plates shown at 9 are for deflecting the electron beam over the screen 2. It is to be understood that coils, not shown, for electro-magnetic focusing and deflection may be employed instead of the anode 7, and plates 8 and 9. The screen 2 may be of a translucent light absorbing glass to absorb ambient light.

The inter-face of the screen 2 may be provided with a plurality of grooves or lenticular like lenses extending vertically across the screen or they may extend horizontally and at a slight angle so that each groove coincides with the path of the electron beam during a line or forward horizontal trace of the electron beam.

In the enlarged view 2′ showing a cross section of a fragmentary portion of the screen 2 certain of the grooves 10, 11—12, 13, 14—15, and 16 are illustrated. The grooves on the inter-face of the screen 2 may be considered in sets or series of three, a single groove for each of the primary colors; for instance, the grooves indicated at 12, 13 and 14 may be one set having a phosphor in groove 12 to yield red light rays when activated by electrons, groove 13 may have a phosphor coating to yield green light rays and the groove 14 may have a phosphor to yield blue light rays. Saying it differently, the screen 2 may be provided with a repeating series of grooves or strips with each groove or strip in a series or set having a different phosphor.

The grooves are preferably circular of different radii or size, or they may be of any other lenticular lens arrangement, to direct the light rays from one or more phosphors in each series of three phosphors to a single strip on the outer-face of screen. The grooves may have the different phosphors ruled or otherwise placed therein with a conventional aluminized or metalized coating covering the whole screen so that each of the grooves in a series becomes a small convex mirror in order to better combine and direct the different light rays in each set or series of grooves to a substantially single horizontal strip or line on the viewing side of the screen as illustrated for the strip or line 17. The next succeeding set of grooves or elongated surfaces may start with blue phosphor in 15 so that both surfaces 14 and 15 will be provided with the same phosphor to yield blue light rays.

The grooves for each series of three strips of phosphor are preferably of such curvature as to combine or direct the light rays from one or more of the phosphors, upon activation by electrons, to a single strip or line on the viewing side of the screen for additive color effects and also to distribute the light rays from one or two phosphors in a series to a strip on the viewing side of the screen substantially equal to the combined width of the three strips of phosphor in a series, so that when a particular color is sampled a number of times at the transmitter a continuous strip or line of that particular color may be produced on the viewing screen.

Figures 2, 3, 4, 5, 7, 8:
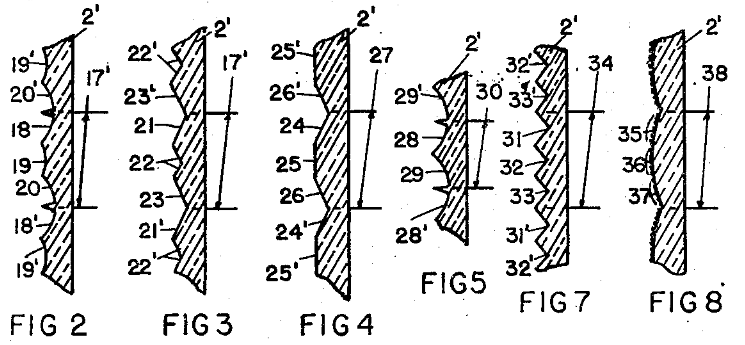
Figures 2 through 8 show alternate screen structure for the cathode ray tube in Figure 1.

The above arrangement of the different phosphors, where two adjacent scanned lines may yield the same color when the lines are parallel to the lengthwise dimension of the grooves, requires an irregular scanning sequence. Therefore, to provide a more uniform scanning arrangement the screen grooves may be provided with phosphors to give the same sequence of colors in each set, as illustrated in Figure 2, in which each set of three grooves 18, 19 and 20 may be provided with different phosphors to yield red, green and blue light rays respectively, which may be combined to produce a different color in the strip 17′ on the outer face of the screen 2′. The spacing of the different phosphors in each series may be less than the resolving power of the normal eye at a relatively short distance from the screen.

In Figure 3 the grooves may be V shape and the surfaces 21, 22 and 23 face in different directions so that the light rays from the three different phosphors on 21, 22 and 23 are combined and directed to substantially the same strip 17′ on the front of screen.

Figure 4 shows another alternate screen structure 2′ with a plurality of elevations extending across the screen. Each elevation or projection comprises a set of three areas 24, 25 and 26 facing in different directions so that the light rays from the three different phosphors on 24, 25 and 26 are mixed and/or directed to substantially a common strip or line 27 on the outer-face of the image screen.

Figure 5 shows a screen structure for a two-color system with a plurality of circular depressions extending across the screen. These depressions or concave surfaces may be grouped into sets of two surfaces which may be similar to the set 28 and 29 with blue-green and orange-red light yielding phosphors respectively. The curvature of the slots or grooves are such as to direct or combine the light rays for each set of two grooves to a common strip, such as 30, on the viewing side of the screen 2′.

Figure 6:
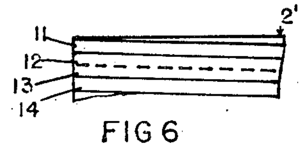

Figure 6 shows a partial plan view of the inter-face of the screen 2′ Figure 1, having the grooves 11—12, 13 and 14 extending in substantially a horizontal direction across the screen. However, as brought out above these grooves preferably may extend vertically from top to bottom across the screen.

The cathode ray tube screen described above with the grooves extending horizontally is primarily intended for use in the larger tubes in which the number of lines scanned per frame are relatively high. A relatively small number of lines per frame would permit using the smaller screen sizes. For instance, the present standard for monochrome television systems is 525 lines per frame interlaced. If three images for color are scanned at the transmitter that makes a total of 1575 lines per frame, three times 525, which should be reproduced in some manner on the cathode ray viewing tube screen at the receiver. Therefore, the receiver tube would require a screen with 1575 grooves which is approximately 100 grooves per inch for a sixteen inch screen. For image reproduction with this relatively high scanning rate the screen structure may be as illustrated in Figure 7, wherein each line of phosphor may be ruled in micro-grooves, thus providing a larger area for the color phosphor for each line than would be provided on a flat surface for the same number of lines per inch. For some tube sizes the different phosphors may be ruled on a flat surface. The grooves may have different phosphors to yield red, green and blue light rays in succession or each different set of three lines may be like the lines 31, 32 and 33 for the different phosphors to yield red, green and blue light respectively for a common strip 34 on outer-face of screen.

Figure 8 shows a uniform lenticular lens structure with each ridge having three strips of phosphor illustrated at 35, 36 and 37 to yield three colored light rays any one of which may be directed to a strip 38 on the viewing side of the screen 2'.

Where the multiplicity of scanned lines are transverse the lengthwise dimension of the grooves or strips, a fewer number of strips may be employed to give resolution of fine detail. With lines scanning transverse the grooves or strips, the number of grooves or strips on the screen is not dependent on the number of lines, as is the case where the scanned lines are parallel to the lengthwise dimension of the grooves and may be equal in number to the grooves.

Therefore, with line scanning transverse the grooves or strips of phosphor, the band width for color picture transmission may be of any desired standard, dependent on the number of phosphor strips or grooves and the number of lines to give the desired picture detail. Furthermore, present-day conventional type synchronizing signals and interlace scanning may be employed.

Figure 9:
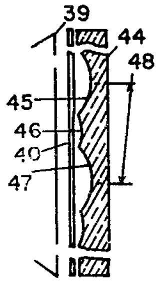
Figure 9 shows an auxiliary color screen and filter system.
Figure 10:
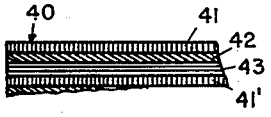
Figure 10 is a partial plan view of the color filter shown in Figure 9.

In Figure 9 I have illustrated a conventional cathode ray viewing tube screen at 39 with only one type of phosphor, which screen may be scanned in the manner as described for screen 2; that is, each set of three lines would be representative of red, green and blue in the scene being televised. A transparent sheet of material 40 is placed in front of the screen 39 having a repeating series of red, green and blue lines similar to 41, 42 and 43 ruled thereon, as illustrated in Figure 10, to produce colored light on the multi-lens structure 44, which may be grooved similar to the screen 2' Figure 1 described above so that the colored light rays from any set of three lines, such as the lines 45, 46 and 47 may be combined or directed to a single strip 48 on the front of the screen 44. The structure 44 may be made of colored laminated pieces of material similar to the method used in multi-lenses which would eliminate the color screen 40. Another method may be employed by ruling coloring substances in each groove of the structure 44.

It is to be understood that phosphors other than those described to produce red, green and blue light may be employed; for instance, each set of three grooves for the screen 2 may be provided with phosphors to yield blue-green, white, and orange-red.

Figure 11:
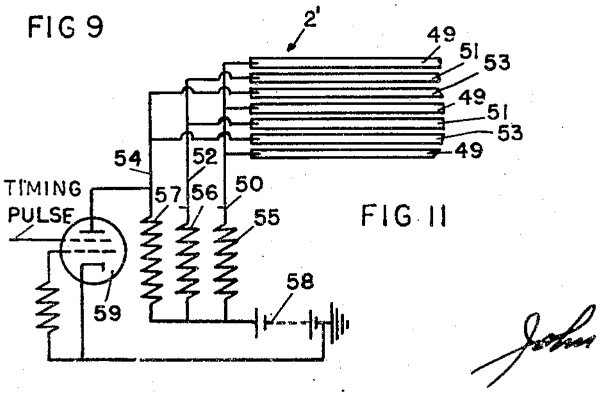
Figure 11 shows a circuit for varying anode potential.

Refer to Figure 11 which shows strips of aluminum for a screen structure 2' similar to Figure 7 except that the aluminized coating for each groove may be below the top of the micro-grooves in order that the metallic coating in each groove is separated or insulated from the metallic coating in the adjacent grooves. The metallic coating or colloidal graphite for each groove may be ruled in or otherwise applied, so that the metallic material 49 for the first grooves in each series of three grooves may be connected to the conductor 50, and the metallic material 51 for the second groove in each series may be connected to the conductor 52, and the metallic material 53 for the third groove in each series may be connected to the conductor 54. The conductors 50, 52 and 54 may be nickel or German silver and extend through the glass bulb.

The screen arrangement shown in Figure 11 is primarily intended for a relatively high number of scanned lines per frame, which lines are substantially parallel to the lengthwise dimension of the grooves. The potential on the conductors 50, 52 and 54 may be varied slightly according as the different grooves or lines are scanned; that is, each conductor 50, 52 and 54 may be maintained at a relatively high anode potential with a slight increase in potential for the particular groove or line being scanned in order to attract the beam of electrons to the desired groove for a more accurate selection of a relatively large number of lines.

One method for varying the potential on the three conductors is illustrated by connecting the conductors 50, 52 and 54 through resistors 55, 56 and 57 respectively to battery 58. A gate amplifier 59 under control of timing pulses produced in a receiver (not shown) may vary the current through resistor 57 to in turn change the potential on conductor 54. The current through the other resistors 55 and 56 would be varied in a similar manner through other gate amplifiers, not shown.

The three-color direct-view cathode ray tube described herein is primarily intended for reproduction of color pictures from signals produced by a line per color sequential scanning, or a line per color simultaneous scanning or multicolor per line, that is, each line trace produces the different colors in accordance with the way they appear in the scene being televised. One system is described in my concurrently filed application for color television systems Serial No. 131,866.

The specific embodiments of the invention which have been given herein are illustrations of how the various features may be accomplished and the principles involved. It is to be understood that the invention contained herein is capable of embodiment in many other forms and adaptations, without departing from the spirit of the invention and the scope of the appended claims.

I claim as my invention:

1. A cathode ray tube for color television having an image screen forming one end thereof, said screen provided on its innerface with a plurality of narrow, discrete areas extending across said screen with adjacent areas of different contour for directing light rays differently, said areas adapted to be scanned in a direction parallel to their lengthwise dimension by an electron beam from a single electron gun.

2. A cathode ray tube for color television having an image screen forming one end thereof, said screen provided on its innerface with a plurality of narrow discrete areas extending across said screen with adjacent areas of different contour for directing light rays differently, the respective areas being grouped into sets of three areas with each area in a set having a different fluorescent material, said areas adapted to be scanned in a direction parallel to their lengthwise dimension by an electron beam from a single electron gun to activate said material.

3. A cathode ray tube for color television having an image screen forming one end thereof, said screen provided on its innerface with a plurality of narrow, discrete areas extending across said screen, the respective areas being grouped into sets of three areas with each area in a set having a different fluorescent material adapted, upon activation by electrons, to produce different colored light rays, each of the said areas in a set having a different contour so as to direct colored light rays from the said different fluorescent materials in each set to a common strip per set on the outerface of said screen, each of the said areas adapted to be scanned in a direction parallel to the lengthwise dimension of said areas by an electron beam from a single electron gun to activate said fluorescent materials.

4. A cathode ray tube for color television comprising an image screen, said screen provided on one face with a plurality of narrow, discrete areas extending across said screen, the respective areas being grouped into sets of three areas with each area in a set having a different contour and provided with a different fluorescent material and a metallic covering to direct different colored light rays, produced in the different fluorescent materials of each set upon activation by electrons, to a single strip for each set along the opposite side of said screen, each of the said areas adapted to be scanned in a direction parallel to the lengthwise dimension of said areas by an electron beam from a single electron gun to activate said material.

5. A cathode ray tube for color television having an image screen forming one end thereof, said screen provided on its innerface with a plurality of narrow, discrete areas, each of the said areas being concave and extending across said screen, the respective areas being grouped into sets of three areas with the areas in each set having different fluorescent material with a metallic covering to form convex mirrors so as to direct different colored light rays produced in the different fluorescent materials for each of the said sets, upon activation by electrons, to a different line for each set along the outer-face of said screen, each of the said areas adapted to be scanned in a direction parallel to the lengthwise dimension of said areas by an electron beam from a single electron gun to activate said fluorescent materials.

6. A cathode ray tube for color television comprising an image screen provided on one side with a plurality of circular parallel grooves with different curvature in each repeating series of three grooves to direct light rays in different directions, the respective grooves extending across said screen and adapted to be scanned in a direction parallel to their lengthwise dimension by an electron beam from a single electron gun.

7. A cathode ray tube for color television comprising an image screen provided on one side with a plurality of parallel grooves with each repeating series of three grooves extending across said screen and of such contour to direct light rays to the same strip on the opposite side of said screen, the grooves in each series being coated with different fluorescent material and adapted to be scanned in a direction parallel to their lengthwise dimension by an electron beam from a single electron gun to activate said fluorescent material.

8. An image screen provided on one side with a plurality of parallel grooves, the respective grooves extending across said screen with each repeating group of three grooves being of such contour that light rays directed through any one of said groups will be combined on a single strip on the opposite side of said screen.

9. An image screen provided on one side with a plurality of parallel grooves, the respective grooves extending across said screen and disposed in repeating groups of several grooves each, a different fluorescent material for each groove in a group to produce light rays of different color, upon activation by electrons, the said grooves in each group being of such contour or curvature that said colored light rays directed through the grooves in any said group will be additively combined and directed to a single strip on the opposite side of said screen.

10. A cathode ray tube for color television comprising an image screen provided on one side with a plurality of parallel grooves, the respective grooves extending across said screen and being disposed in groups of several grooves each of such curvature to direct light rays to the same strip on the opposite side of said screen, said grooves in each group having different fluorescent material so that different colored light rays produced in the fluorescent material, when activated by electrons, will be additively combined and directed to a single strip on the opposite side of said screen, each of the said grooves adapted to be scanned in a direction parallel to the lengthwise dimension of said grooves by an electron beam from a single electron gun to activate said fluorescent materials.

11. An image screen provided with a plurality of narrow discrete areas, the respective areas extending across said screen and arranged in repeating groups of several grooves each, each of the said areas in a group being of a different curvature and of a different color so that light rays directed through at least two of the said areas in any group will be projected in a different color.

12. A cathode ray tube for color television having an image screen forming one end thereof, said screen provided with a repeating series of grooves on its inner-face with the several grooves for each series having different phosphors, the said grooves for each series being of such curvature so as to direct light rays of different color from the said phosphors, upon activation by electrons, to the same strip on the outer-face of said screen, an electron gun in said tube to produce an electron beam, said grooves adapted to be scanned by said beam of electrons to activate said phosphors.

13. A cathode ray tube for color television having an image screen forming one end thereof, said screen provided with a repeating series of discrete strips on its inner-face with the several strips for each series having different phosphors, the different said strips for each series being of such curvature so as to direct light rays of different color from said phosphors, upon activation by electrons, to the same area on the outer-face of said screen, a source of electrons for said tube, said image screen adapted to be scanned by an electron beam from said source transverse said strips.

14. In television apparatus, the combination of: an evacuated bulb; an image screen for said bulb having on one face a plurality of relatively narrow, discrete areas extending across said screen and being disposed in groups with a different phosphor for each area in a group, the said areas for each group being of such contour that colored light rays from any one of the different phosphors in any group, upon activation by electrons, will be directed substantially to a single strip or line on the opposite face of said screen, a source of electrons in said bulb, each of the said areas adapted to be scanned by an electron beam from said source to activate said phosphors.

15. A combination according to claim 14 wherein said different phosphors for each of the said groups yield red, blue and green light rays upon activation by said beam of electrons.

16. A combination according to claim 14 wherein said different phosphors for each of the said groups yield white and colored light rays upon activation by said beam of electrons.

17. A cathode ray tube as claimed in claim 14 wherein the said several grooves for each of the said series are each provided with a metallic coating separated from each other and adapted for potential changes in rotation.

18. In color television apparatus, the combination of: a cathode ray tube, an image screen associated with said tube having a plurality of relatively narrow discrete surfaces, the respective surfaces extending throughout the width of said screen and arranged in a repeating series of several surfaces, with a different color characteristic for each surface in a series, each of the said surfaces in a series being of a different curvature to combine light rays passing through each series of surfaces, and means associated with said tube including a source of electrons to direct light rays through said curved surfaces to produce additive color projections.

19. A cathode ray tube for color television comprising an image screen, said screen provided with a plurality of narrow discrete areas, the respective areas extending across said screen and being disposed in a repeating group of several grooves with a different color for each area in a group, each of the said areas in a group of a different curvature, with like fluorescent material covering all of said areas so that light rays directed through at least two of the different areas in any one group, produced in the fluorescent material for said one group upon activation by electrons, will be projected in a different color, each of the said areas adapted to be scanned by an electron beam from a single gun to activate said materials.

20. A cathode ray tube for color television comprising an image screen having a plurality of narrow discrete areas, the respective areas extending across said screen and disposed in a repeating group of several areas with each area in a group having a different color characteristic and of such curvature as to combine light rays passing through each group of areas, the several areas for each of the said groups having electrical conductors separated from each other and adapted for potential changes in rotation, means to produce an electron ray in said tube, and means associated with said tube including said electron ray and said electrical conductors to direct light rays through the said curved areas to produce additive color projections.

JOHN H. HOMRIGHOUS.

REFERENCES CITED

The following references are of record in the file of this patent:

UNITED STATES PATENTS

| Number | Name | Date |
|---|---|---|
| 1,467,132 | Bilstein | Sept. 4, 1923 |
| 1,934,821 | Rudenberg | Nov. 14, 1933 |
| 1,942,841 | Shimizu | Jan. 9, 1934 |
| 1,988,605 | Michelssen | Jan. 22, 1935 |
| 2,029,639 | Schlesinger | Feb. 4, 1936 |
| 2,096,986 | Von Ardenne | Oct. 26, 1937 |
| 2,121,356 | Knoll | June 21, 1938 |
| 2,287,415 | Burnett | June 23, 1942 |
| 2,307,188 | Bedford | Jan. 5, 1943 |
| 2,310,863 | Leverenz | Feb. 9, 1943 |
| 2,330,604 | Messner | Sept. 28, 1943 |
| 2,446,440 | Swedlund | Aug. 3, 1948 |
| 2,446,791 | Schroeder | Aug. 10, 1948 |
| 2,461,515 | Bronwell | Feb. 15, 1949 |
| 2,472,988 | Rosenthal | June 14, 1949 |
| 2,480,848 | Greer | Sept. 6, 1949 |
| 2,481,839 | Goldsmith | Sept. 13, 1949 |
| 2,494,992 | Ferguson | Jan. 17, 1950 |
| 2,518,200 | Sziklai | Aug. 8, 1950 |
| 2,543,477 | Sziklai et al. | Feb. 27, 1951 |
| 2,544,690 | Koch | Mar. 13, 1951 |

FOREIGN PATENTS

| Number | Country | Date |
|---|---|---|
| 562,168 | Great Britain | June 21, 1944 |